United States Patent [19]
Schneider et al.

[11] 3,805,640
[45] Apr. 23, 1974

[54] ELECTRONICALLY CONTROLLED POWER TRANSMISSION

[75] Inventors: Raymond C. Schneider; Joseph B. Snoy, both of Rockford, Ill.

[73] Assignee: Twin Disc, Incorporated, Racine, Wis.

[22] Filed: Sept. 8, 1972

[21] Appl. No.: 287,585

[52] U.S. Cl............. 74/645, 74/733, 74/866, 74/365
[51] Int. Cl..... F16h 47/00, B60k 21/00, F16h 3/08
[58] Field of Search................ 74/645, 733, 866

[56] References Cited
UNITED STATES PATENTS

| | | | |
|---|---|---|---|
| 3,653,281 | 4/1972 | Shirai et al. | 74/731 |
| 3,613,480 | 10/1971 | Shall | 74/733 |
| 3,448,640 | 6/1969 | Nelson | 24/866 |
| 3,693,479 | 9/1972 | Toyoda et al. | 74/731 |

Primary Examiner—Arthur I. McKeon
Attorney, Agent, or Firm—James E. Nilles

[57] ABSTRACT

A power transmission includes an engine-driven lock-up type torque converter for driving a speed changing gear shift mechanism shiftable to different speed ranges by solenoid operated clutch valves. An electronic controller provides output signals to operate the clutch valves and also to inhibit lock-up in certain speed ranges. The controller receives input signals from a manually operable multiposition speed range selection switch; from speed sensors on the torque converter and the gear shift mechanism; and from an engine throttle position control. The control effects automatic shifting to selected speed ranges and automatically shifts itself to maintain selected speeds; introduces a time delay in each transitional speed range to prevent hunting; effects downshifting, shifting to neutral and reversal only when correct speed ranges are reached; avoids shifting to neutral unless that position is actually selected; and performs other functions.

17 Claims, 7 Drawing Figures

SEL 1 THRU SEL 5 ARE SELECTOR LEVER POSITIONS
S¼ THRU S26 ARE SPEED SWITCHES
CL1 THRU CL5 ARE CLUTCHES BEING ENERGIZED

FIG. 7

ELECTRONICALLY CONTROLLED POWER TRANSMISSION

BACKGROUND OF THE INVENTION

1. Field of Use

The present invention relates generally to a power transmission including an engine driven torque converter connected to a speed changing gear shift mechanism for transmitting power to, for example, the wheels of a vehicle, such as off-highway earth-moving machines in the 200 to 750 horsepower class, for example. In particular, it relates to such a transmission wherein electronic control means are provided to operate the gear shift mechanism and other transmission components.

2. Description of the Prior Art

The U.S. Pat. No. 3,613,480 issued Oct. 19, 1971 to B. K. Shull for "Power Transmission having Downshift Inhibitor" and assigned to the same assignee as the present application, discloses a power transmission including an engine-driven torque converter (having a hydraulically operable lock-up clutch) connected to drive a speed changing gear shift mechanism which is shiftable to different speed ranges by operation of solenoid operated clutch valves. The solenoid operated clutch valves are selectively operable in response to the positioning of a manually operable multiposition electric speed range selector switch. The use of an electric speed range selector switch offers numerous advantages over prior art manually operable mechanical shift levers. Some transmissions employ an electric control which receives input signals from the speed selector switch and translates them into output signals for operation of the clutch solenoids which automatically carry out certain control functions. Prior art electric controls of the aforesaid type have been limited in the control functions they are able to effect and have also been susceptible to failure due to acceleration forces, shock, vibration, and environmental conditions (dirt and water) to which they are exposed during actual use on earth moving machines, trucks, or other equipment.

SUMMARY OF THE PRESENT INVENTION

In accordance with the present invention there is provided an engine-driven torque converter for driving a speed changing gear shift mechanism which transmits power to vehicle wheels.

The torque converter is provided with a lock-up clutch for connecting the torque converter into direct drive when engine speed is sufficiently high. Shifting in or out of clutch lock-up is controlled by a lock-up clutch valve which in turn, is responsive to pressure conditions in a control valve on the gear shift mechanism. However, operation of the lock-up clutch valve can be inhibited by operation of a lock-up clutch solenoid valve, as hereinafter described.

The gear shift mechanism is provided with sets of gears for different speed ranges and with clutches which are selectively operable to shift the mechanism into different speed ranges. These clutches are operated by solenoid controlled clutch valves.

The torque converter is also provided with a solenoid operated retarder valve which automatically engages to effect retardation of the speed of the gear shift mechanism when the torque converter is in direct drive and torque converter turbine speed exceeds engine high-idle speed. The retarder disengages after the lock-up clutch is signalled to disengage.

An electronic controller is provided to provide electrical output signals for actuation or non-actuation of the lock-up clutch solenoid valve, the gear shift mechanism solenoid operated clutch valves, and the solenoid operated retarder valve.

The electronic controller receives input signals from a manually operable multiposition speed range selection switch; from an output speed sensor on the gear shift mechanism; from a turbine speed sensor on the torque converter (to effect retarder operation); and from an engine throttle position sensor.

The electronic controller is provided with a source of electric power (such as a 12 or 24 volt battery) and broadly comprises the following circuits.

1. A first circuit comprising solid state logic components for supplying output signals to solenoid drives (i.e. amplifiers) which operate the gear shift mechanism clutch valve solenoids (for shift sequencing), the lock-up clutch valve solenoid (for lock-up inhibition), and a separate logic circuit for the retarder valve solenoid;

2. A second circuit comprising an oscillator circuit, a first pulse shaper and frequency converter circuit, a time delay circuit, and speed switch circuits (including factory adjustable potentiometers) for receiving input signals from the throttle position sensor and the gear shift mechanism speed sensor and supplying output signals to the aforesaid first (logic) circuit; and 3. A third circuit comprising a second pulse shaper and frequency converter circuit and a set point speed switch circuit (including a factory adjustable potentiometer) for receiving input signals from the torque converter turbine speed sensor and supplying output signals to the aforesaid separate logic circuit for the retarder valve solenoid.

The range selection switch is provided with a selectively operable override switch which, when actuated, eliminates all automaticity from the electronic controller and allows the range selection switch to function directly to operate the solenoids of the gear shift mechanism clutch valves.

A transmission in accordance with the present invention is capable of the following functions. The electronic control effects automatic upshift or downshift to the selected speed range; effects automatic shifting to maintain appropriate speed in view of the speed range selected; effects an automatic time delay in each speed range when upshifting or downshifting to speed ranges other than the next range to prevent hunting; effects downshifting or a shift to neutral only when the correct speed range is reached; prevents any shifting to neutral unless that position is actually selected; prevents a shift reversal until a predetermined low speed is reached; inhibits lock-up in certain speed ranges; and performs other control functions hereinafter described.

The principle advantages of a transmission in accordance with the invention are that it requires less skill on the part of the operator; it provides greater operating efficiency in that correct speed ranges are automatically selected and maintained; it reduces the possibility of damage to the transmission due to the use of incorrect operation procedures; and it increases the operating life of all transmission components due to the fact that they operate within correct desired speed ranges and design limits.

Other objects and advantages of the present invention will appear hereinafter as this disclosure progresses, reference being had to the accompanying drawings.

DESCRIPTION OF A PREFERRED EMBODIMENT

Figure 1:
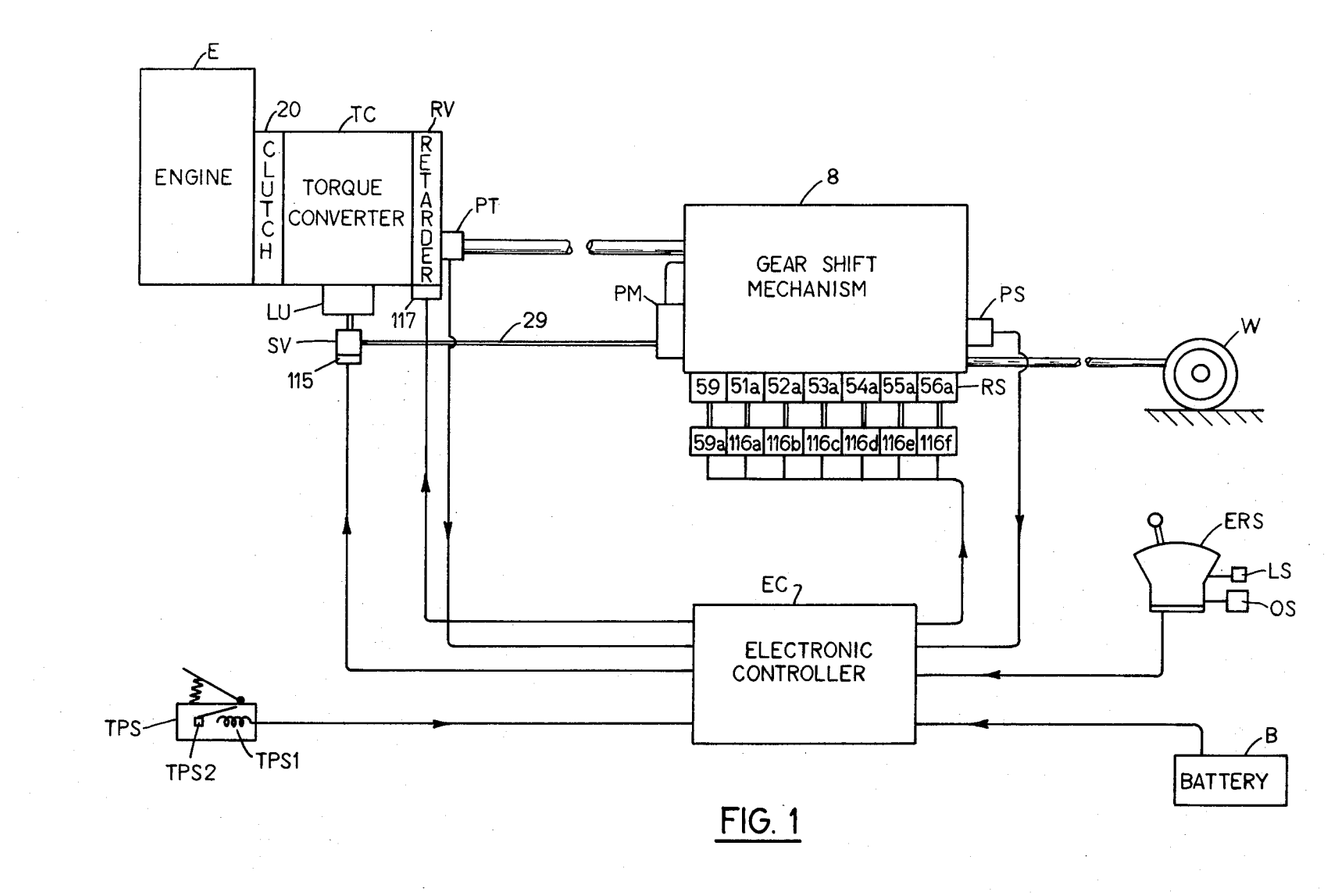
FIG. 1 is a diagrammatic view of a transmission in accordance with the present invention.

FIG. 1 shows that in accordance with the present invention there is provided torque converter TC driven by engine or prime mover E for driving a speed changing gear shift mechanism 8 which transmits power to vehicle wheels W.

The torque converter TC is provided with a lock-up clutch 20 for connecting the torque converter for direct drive when the speed of engine E is sufficiently high. Shifting in or out of clutch lock-up is controlled by a lock-up clutch valve LU which in turn is responsive to pressure conditions in a control valve PM connected to the gear shift mechanism 8. However, operation of the lock-up clutch valve LU can be inhibited by operation of a lock-up clutch solenoid valve SV having a solenoid 115 as hereinafter described.

The torque converter TC is also provided with a solenoid operated retarder valve RV having a solenoid 117 which automatically engages to effect retardation of the speed of torque converter TC when the torque converter is in direct drive and torque converter turbine speed exceeds engine high-idle speed. The retarder valve RV disengages after the lock-up clutch 20 is signalled to disengage.

Figure 2:
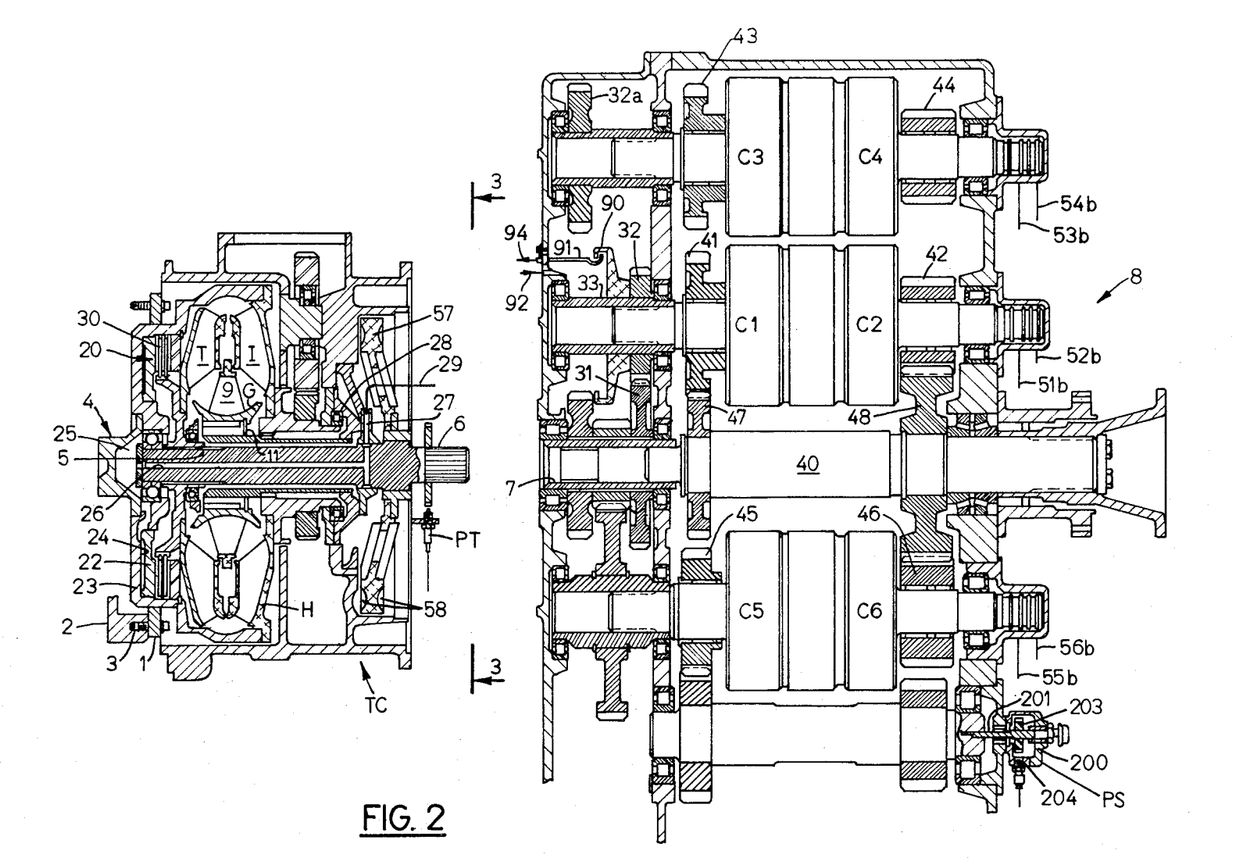
FIG. 2 (on two sheets) is a schematic view of some of the components shown in FIG. 1, with such components shown in cross-section.

The gear shift mechanism 8 is provided with sets of gears such as 41 through 46, shown in FIG. 2, for different speed ranges and with clutches C1 through C6 also shown in FIG. 2, which are selectively operable to shift the mechanism into different speed ranges. These clutches are operated by solenoid controlled clutch valves 51a through 56a, also shown in FIG. 2.

An electronic controller EC is provided to furnish electrical output signals for actuation or non-actuation of the lock-up clutch solenoid valve SV (operated by a solenoid 115), the gear shift mechanism solenoid operated clutch valves 51a through 56a (operated by solenoids 116a through 116f) and the solenoid operated retarder valve RV (operated by a solenoid 117).

The electronic controller EC receives input signals from a manually operable multiposition speed range selection switch ERS; from an output speed sensor PS on the gear shift mechanism 8; from a turbine speed sensor PT on the torque converter TC (to effect retarder operation); and from an engine throttle position sensor TPS.

Figure 5:
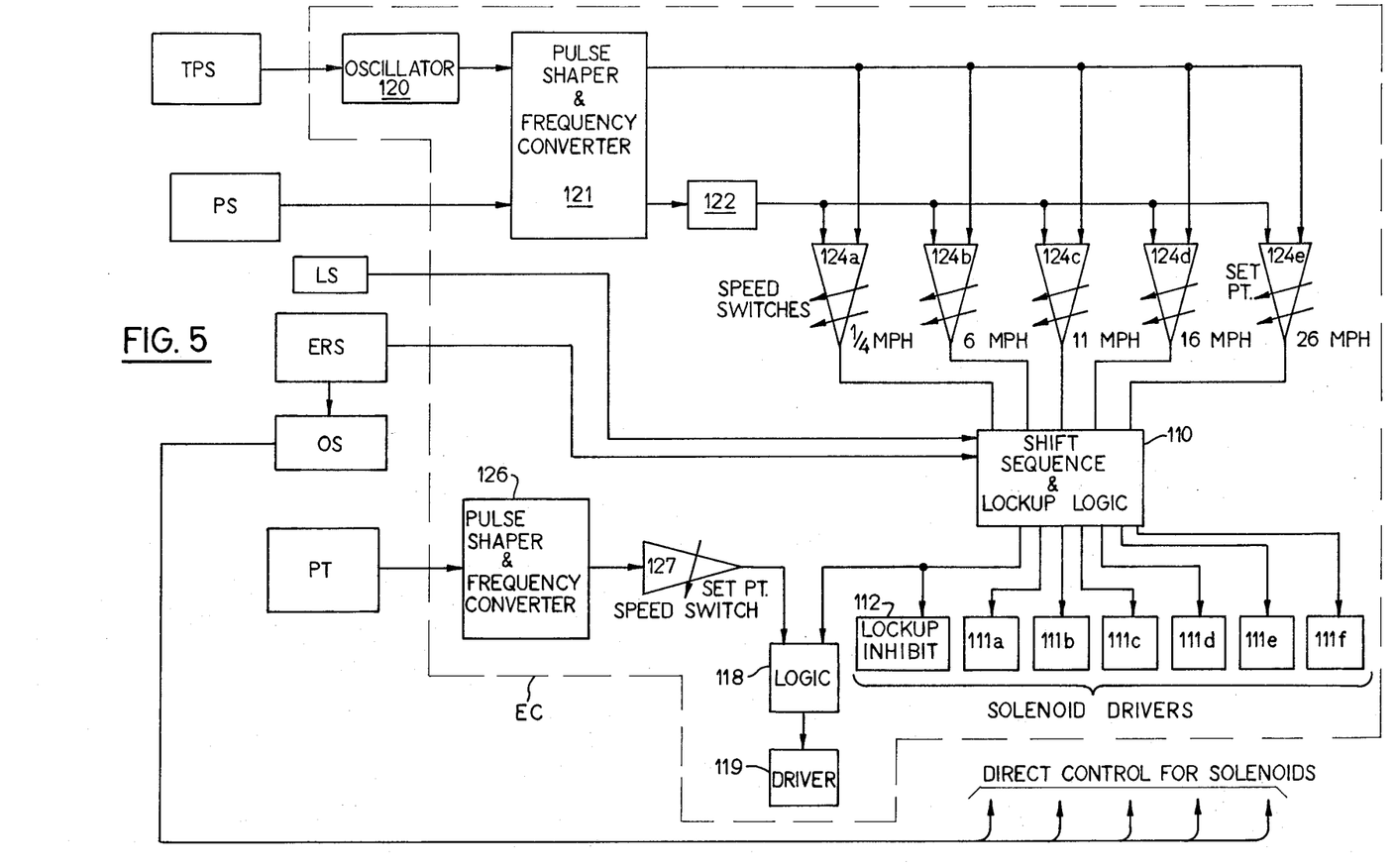
FIG. 5 is a schematic view of the electrical circuitry shown in FIG. 1 with portions of the electronic controller shown in greater detail.

The electronic controller EC is provided with a source of electric power (such as a 12 or 24 volt battery B) and, as FIG. 5 shows, broadly comprises the following circuits.

1. There is a first circuit 110 comprising solid state logic components shown schematically in FIG. 6, for supplying output signals to solenoid drives 111a through 111f and 112 (i.e. amplifiers) which operate the gear shift mechanism clutch valve solenoids 116a through 116f (for shift sequencing) and the lock-up clutch valve solenoid 115 (for lock-up inhibition) respectively. A separate logic circuit 118 is provided for a driver 119 for operating the retarder valve solenoid 117.

2. There is a second circuit comprising an oscillator circuit 120, a first pulse shaper and frequency converter circuit 121, a time delay circuit 122, and speed switch circuits 124a through 124e (including factory adjustable potentiometers) for receiving input signals from the throttle position sensor TPS and the gear shift mechanism speed sensor PS and for supplying signals to the aforesaid first (logic) circuit 110.

3. There is a third circuit comprising a second pulse shaper and frequency converter circuit 126 and a set point speed switch circuit 127 (including a factory adjustable potentiometer) for receiving input signals from the torque converter turbine speed sensor PT and supplying output signals to the aforesaid separate logic circuit 118 for the retarder valve solenoid driver 119.

The range selection switch ERS is provided with a selectively operable override switch OS which, when actuated, eliminates all automaticity from the electronic controller EC and allows the range selection switch ERS to function directly to operate the solenoids 116a through 116f and 59a of the gear shift mechanism clutch valves 51a through 56a and 59, respectively.

A transmission in accordance with the present invention is capable of the following functions.

Normal Upshifting Mode: Placement of the selector ERS in any given speed range position initiates automatic shifts of gear shift mechanism in converter drive up to the selected speed. A shift to lock-up is then allowed by valve LU; being triggered from the turbine speed sensor PM. Downshifting from given speeds through converter ranges is allowed down to low gear. With selector ERS in neutral position, no shifting is allowed with one exception; with any clutch engaged and selector ERS then put into neutral position, downshifting occurs but neutral is not attained until output speed drops below the direction inhibit speed setting. Neutral cannot be attained unless the selector lever ERS is in neutral position.

Adjustable Speed Control: The correct speed signal for automatic shifting from one range to another is preselected according to transmission usage, and is adjustable within the electronic control EC by setting speed switches 124a through 124e. This speed is factory chosen on the basis of full throttle engine operation.

Inhibition of Lock-Up: A shift to lock-up is allowed within every transmission speed range, but can be inhibited until the desired range is reached due to the action of the lock-up inhibitor valve SV. The valve SV inhibits actuation of the lock-up clutch in all ranges, except that range that the selector lever of selector switch ERS is presently placed in, if switch LS is in the inhibit (on) position. This switch can be physically placed either on the range selector ERS or on the control box EC. FIGS. 1, 2, 4 and 5 show the location of switch LS as being on the selector switch ERS. In appearance switch LS is similar to switch OS, also shown in FIG. 4. Thus, a transmission for a truck could have automatic full power shifting with lock-up in every range and a transmission for a motor scraper could have lock-up inhibited until the highest chosen selector range is reached. Positioning of the switch LS in the off position allows valve SV to be open at all times regardless of transmission range. Therefore, lock-up will occur whenever the pitot device 90 senses the correct speeds.

Lockup Clutch Control (hydraulic): The shift from converter range to lock-up range is achieved through hydraulic lock-up valve LU when senses turbine speed through pitot device 90 in control valve PM and the speed at which the lock-up comes in and out is set by adjustments on a hydraulic valve in valve PM. This feature together with flow sensing retarder valve RV that disconnects lock-up when transmission clutch shifts are made, includes solenoid valve SV so that the electric control EC can inhibit lock-up in any range other than that called for by the operator's shift selector ERS.

Downshift control: Operator movement of shift selector ERS at any time to a lower gear allows a lower gear downshift only when the correct speed is achieved by the transmission output shaft. The direct drive or lock-up clutch 20 wil be disconnected by the flow sensing valve PM when the transmission actually downshifts. These downshift speeds are factory determined and adjusted on the basis of full throttle engine operation.

Unstable control criteria: Time delay 122 circuit operates so that regardless of speed signals from PT or PS or movement of selector switch ERS, the transmission will shift down only one range at a time and stay in that range for at least a period of approximately one-half second before another shift can be initiated. This same time delay is present in the upshifts. This type of delay gives guaranteed downshifts of one range at a time regardless of vehicle speeds or lever movement and, therefore, protects the transmission thermally from multiple range downshifts. It also helps in preventing hunting between gear ranges under variable road load conditions.

Inhibition of vehicle reversal with transmission: The control EC, particularly switch 124a, does not allow vehicle direction reversals to be made at any speed above approximately one-fourth MPH. This eliminates shifts from forward to reverse or reverse to forward at high vehicle speeds which are generally injurious to clutches. A lever movement of selector ERS from forward to reverse at speeds above the inhibit speeds inhibits any transmission action until the inhibit speed is reached because of the action of electronic logic.

Unwanted Neutral shifts: The transmission does not shift to neutral regardless of any series of selector lever movements, except when moved to the neutral position on the selector ERS.

Retarder control: Automatic engagement of the hydraulic retarder RV by the control EC occurs when the torque converter is in direct drive and turbine speed exceeds engine high-idle RPM. Thus, if a truck proceeded downhill in lockup and began to overspeed, the retarder RV would be engaged and kept on until the lockup clutch was signalled to disengage.

Electrical System failure: The transmission selector valve assembly RS keeps the transmission engaged in the presently operating gear when any electrical system failure occurs.

Failure of Speed Pickup Sensor: The logic system keeps the vehicle operating in first forward or first reverse (or neutral) upon failure of the transmission output speed sensor and uses the turbine speed pickup to check on the fact that the output sensor has failed. This circuit then notifies the operator through a warning light L which may be located on switch ERS, that he has a failure in the output sensor.

Override Feature: Override switch OS connected to switch ERS when actuated by the operator, eliminates all automaticity from the control EC and makes it strictly a manual control device. Thus, the operator can shift to any gear at any time in any condition using the transmission as a device to stop, reverse, retard or accelerate the vehicle in any unusual fashion.

Throttle Position Control: Control TPS signals to the control EC the position of the engine throttle and this signal is used to change the speed signals for up and downshifts in the transmission to different values, depending on the throttle setting. The downshift points at engine speeds of approximately idle to 900 RPM, for example, can be automatically set to take place at one-third of low gear vehicle speed. This will occur for all ranges not only the lower gears.

Torque Converter Gear Shift Mechanism

As FIG. 2 shows, the power transmission comprises a torque converter TC which has an internally toothed driving ring 1 that is bolted to an engine flywheel 2 by bolt means 3. The flywheel is piloted on diameter 4 and the engine drives the housing H of the torque converter in a known manner. The impeller assembly I is fixed to the housing for rotation therewith. In this matter, the engine flywheel driving ring, rotating housing, and the impeller assembly all rotate at engine speed and direction.

When the transmission is in converter drive, that is, when the converter TC is used as a torque multiplier, the fluid is moved by the impeller I and directed against the blades of the turbine assembly T which is spline connected as at 5 to the converter output shaft 6. Shaft 6 in turn transmits drive power to the input sleeve 7 of shift mechanism 8. After the fluid passes the turbine blades, it is redirected to the impeller blades by the blades 9 of the guide assembly G which is mounted on a freewheel assembly 11.

Converter drive serves three main functions: (1) to move the vehicle from a standstill, initially; (2) to provide a high output torque over a broad speed range for operation in adverse areas; and (3) to function as a shock damper during each speed shift.

When the output torque requirements exceed input torque from the engine E, the freewheel assembly 11 for the guide assembly G is locked. When the input requirements are equal to, or less than, input torque, the guide assembly freewheels.

Fluid actuated, lock-up clutch 20 is provided between the housing H and the turbine assembly T so that the torque converter TC is in direct drive with the power flow through the driving ring 1, housing H, lock-up clutch 20, turbine wheel assembly T, and converter output shaft 6. Under this condition, the impeller I, turbine T and free-wheeling guide G rotate as a unit.

The lock-up clutch 20 includes a piston 22 slideable in a cylinder 23 formed in the housing H and defining an expansible, pressurizable, clutch actuating chamber 24. Fluid passage 25 in the housing, passage 26 in the shaft, passage 27 in the guide wheel carrier 28, and conduit 29 act to conduct fluid from a lockup valve LU, to be described later.

When the valve LU permits pressurized fluid to flow to the clutch actuating chamber 24, the piston 22 causes clamp up of the conventional interleaved, friction plates 30 located between the housing H and the turbine assembly T, thus causing direct drive through the torque converter.

The converter output shaft 6 transmits the drive to speed changing gear shift mechanism 8. More specifically, shaft 6 drives the input sleeve 7 of the mechanism. A drive gear 31 is spline-connected to the input sleeve and meshes with gear 32 fixed to shaft 33 on which range clutches C1 and C2 are mounted. Each clutch C1 through C6 has a respective gear 41, 42, 43, 44, 45 and 46 which mesh with gears 47 and 48 fixed to shaft 40. Thus, the power flow is through a selected combination of these clutches, and then to the output shaft 40. The selection is made as hereinafter described.

Figure 3:
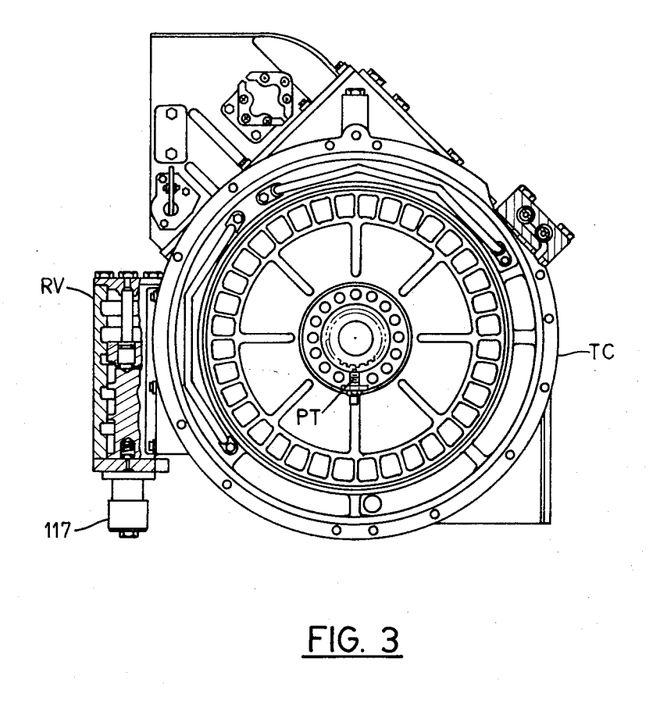
FIG. 3 is an end view of the torque converter taken on line 3—3 of FIG. 2.

As FIGS. 1 and 3 show, torque converter TC is provided with a retarder valve RV which has solenoid 117. Retarder valve RV controls fluid flow to a retarder 57 (shown in FIG. 2) on shaft 6 of torque converter TC which serves as a fluid coupling. Energization of solenoid 117 by controller EC opens valve RV and allows fluid to flow into a chamber 58 in which retarder 57 rotates so as to introduce resistance to rotation of retarder 57 to slow down shaft 6. Retarder valve RV is, in effect, responsive to speed sensor PT on torque converter TC and operates when the torque converter is in direct drive and its speed exceeds engine high-idle speed. Retarder valve RV closes and the retarder disengages when the lockup clutch 20 disengages due to low engine speed.

Hydraulic Range Valves

The transmission range selector valve assembly RS, shown in FIGS. 1 and 2, provides seven positions—five forward, a neutral, and one reverse. First range position permits drive through the converter and first speed gear train only. All other forward range positions provide converter drive at low and medium turbine output speeds, but provide automatic shifting to direct drive at a predetermined turbine output speed setting. As a result of the action of the lock-up flow sensing valve LUF, the converter automatically changes from direct drive to converter drive whenever a shift is made. The reverse acutation of the range selector valve RS through the appropriate solenoid provides converter drive through the reverse gear train only.

The range selector valve assembly RS includes a body 50, containing six solenoid controlled speed range valves 51a, 52a, 53a, 54a, 55a and 56a, each having a fluid passage 60 for main pressure delivered by the lock-up valve LU. The valves each have balanced spools 62 located in bore 63 and a return spring 64. Solenoids 116a, 116b, 116c, 116d, 116e, and 116f are provided, one for operating each valve. These solenoids are conventional and each have orifice control armature plungers for their respective valves. The solenoid operated valves thus permit fluid to flow to the selected clutches to select the desired speed range and direction for the vehicle. The solenoid lead wires 67 are connected to the electronic controller EC and the latter is connected to the electric range selector ERS by wires 66, to be described. Conduits 51b, 52b, 53b, 54b, 55b and 56b place their respective solenoid valves in fluid delivering communication with the respective hydraulically actuated friction clutches C1, C2, C3, C4, C5 and C6.

As FIG. 2 shows, range selector valve assembly RS is provided with a neutral solenoid valve assembly 59 including a solenoid 59a, the latter being connected by a solenoid lead wire 59b to electronic controller EC. Energization of solenoid 59a causes actuation of neutral valve 59 and this, in turn, causes gear shift mechanism 8 to shift into neutral. Actuation of neutral valve 59 causes any other speed range valve in valve assembly RS which may be engaged to disengage. Range selector valve assembly RS is similar to that described in U.S. Pat. No. 3,667,501 issued June 6, 1972, to Snoy and Shull for "Selector Valve Assembly With Mechanical Latch" assigned to the same assignee as the present application.

Electric Range Selector

Figure 4:
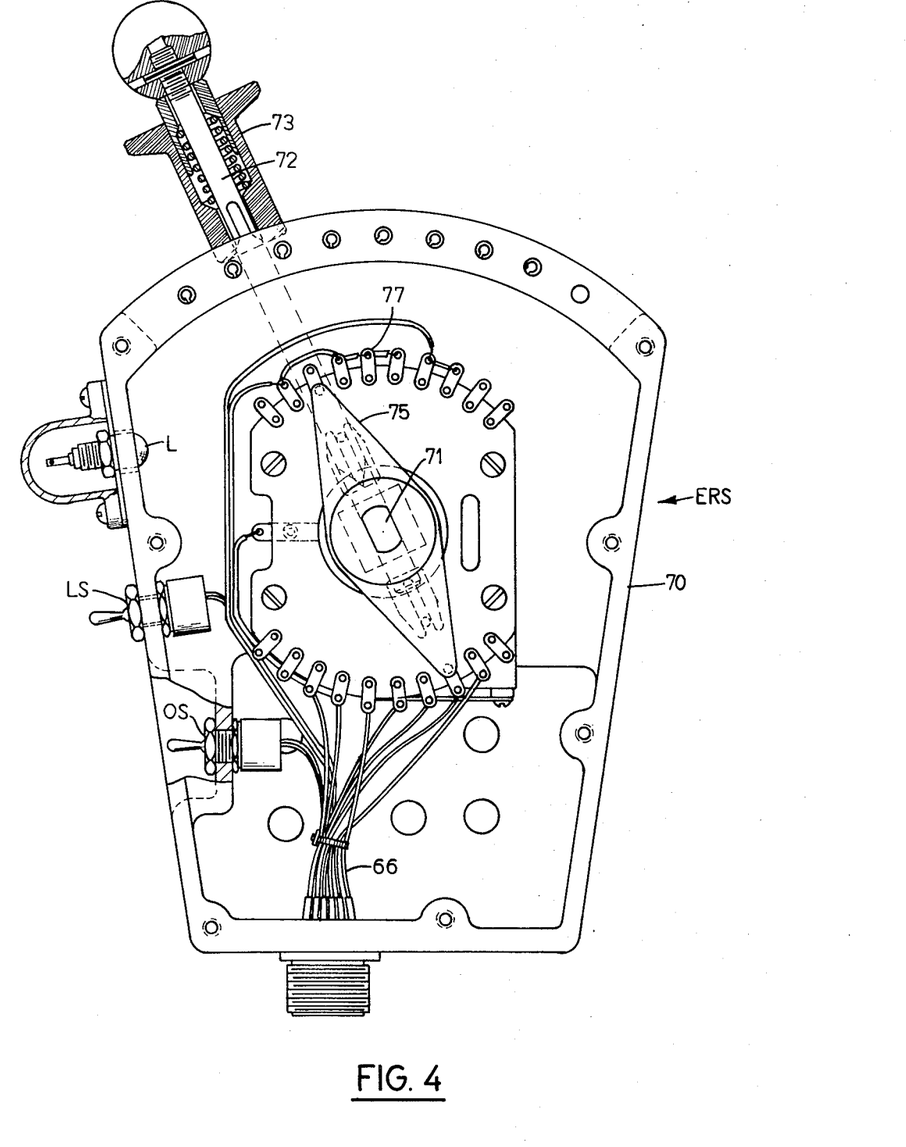
FIG. 4 is an enlarged view of the interior of the speed range selector switch taken on line 4—4 of FIG. 2.

The electric range selector ERS is mounted convenient to the vehicle operator and, as FIGS. 2 and 4 show, includes a housing 70 in which a shift lever shaft 71 is journalled. A speed selector means in the form of a shift lever 72 is fixed to the shaft 71 and extends from the housing where it has a sleeve detent 73 shiftably mounted thereon. A multiple tap rotary switch 75 is connected to the shaft 71 for oscillation therewith and contact with the appropriate terminal taps 77 which are so located in a circumferential manner, that through the selected gear train the lever range positions, coincide with the shift positions.

FIGS. 1, 4 and 5 show that range selector switch ERS is provided with an override switch OS which enables the vehicle operator to selectively eliminate all automaticity from the electronic controller EC and allows the switch ERs to function directly to operate the solenoids 116a through 116f and 59a.

Hydraulic System

As FIG. 2 shows, the fluid pressure system includes the previously mentioned range selector valve RS, the lockup valve LU, a lubrication regulator valve LR, a converter regulator valve CR, a main valve M, and a lockup flow valve LUF.

Also provided is a means for sensing or measuring the speed of the torque converter to operate the lockup clutch 20. This means takes the form of a pitot device 91 which includes a spinner member 90 that is mounted for rotation with the transmission, for example by being mounted with gear 32 driven from input shaft of the transmission. The member 90 has a radial pocket formed therein to which fluid is supplied via conduit 92 through the fluid lubrication valve LR. Thus, when the speed of the transmission input is such that a sufficiently high head of fluid is formed in the chamber, this fluid pressure head is transmitted via conduit 94 to the end of the lockup valve LU. This pressure then causes the lock-up valve to shift in its bore and permits pressure fluid from pump P to flow via the main pressure conduit 96, the groove 97 in the spool 98 of the lock-up valve and then out passage 99 of the valve. The fluid then flows via passage 29 through the lock-up inhibit valve SV and then to the torque converter lock-up clutch.

Thus, when the torque converter output has reached a certain speed as reflected in the pitot means, the pressure fluid from the pitot is used to shift the lock-up valve, thereby permitting pressure fluid to flow to the torque converter lock-up clutch. In this manner, the torque converter is placed in direct drive.

When the turbine speed of the torque converter then decreases to a certain value, as reflected in the pitot means, the lock-up valve LU moves in the opposition direction and cuts off main pressure from the lock-up clutch 20.

Referring again to the lock-up flow valve LUF, an orifice 101 is provided between passage 102 and passage 103. If the transmission is being upshifted, there will be fluid flow in the clutch supply line 105 which leads from the lock-up flow valve to the range selector valve RS. This flow causes the lock-up flow valve to shift against the action of its biasing spring 107 to hereby permit a large supply of pressure fluid to pass and also dump the pressure from the pitot means via conduit 94.

After the upshift is completed, the lock-up flow valve LUF returns to the position shown. However, turbine speed of the torque converter has decreased so that the converter will not go into lock-up position again until the vehicle speed, that is the turbine speed, has increased, to thereby again build up pressure in the pitot means and consequently again shift the lockup valve LU.

Electronic System

FIGS. 1, 2 and 5 show that electronic controller EC is provided with electrical input signals from speed range selection switch ERS, from output speed sensor PS, from turbine speed sensor PT, from engine throttle position sensor TPS, and switch LS.

As FIGS. 1 and 5 show, electronic controller EC receives input signals from an output speed (vehicle speed) sensor PS on gear shift mechanism 8 and from a turbine speed sensor PT on the torque converter, as FIG. 2 shows. Both speed sensors PS and PT are similar in construction and mode of operation and a description of sensor PS will suffice for both. As FIG. 2 shows, sensor PS comprises a housing 200 in which a shaft 201 is mounted for rotation. Shaft 201 is secured to and driven by a rotating component in gear shift mechanism 8. Shaft 201 is provided with a toothed wheel 203 which rotates past a magnetic pickup device 204 located in housing 200 and causes the latter to generate an electrical pulse as each wheel tooth moves therepast. Thus, the frequency of pulses produced by device 204 is direclty related to the speed of wheel 203 and the mechanism which drives it.

Electrical signals produced by the sensors PS and PT are in the form of sine waves, the frequency and pulse width of which vary. Since only the pulse width of these signals is of significance to electronic controller EC, the pulse shapers 121 and 126 clip the pulses and provide converted output signals based on the frequency of the original signals.

The speed switch circuits 124a through 124e are operational amplifiers which incorporate potentiometers (not shown) which are understood to be preset or factory adjusted to provide appropriate output signals to the solenoid amplifier 111a through 111f which correspond to speed points at which shifting is desired to occur. These settings would vary depending on the application of a particular transmission mechanism.

Figure 6:
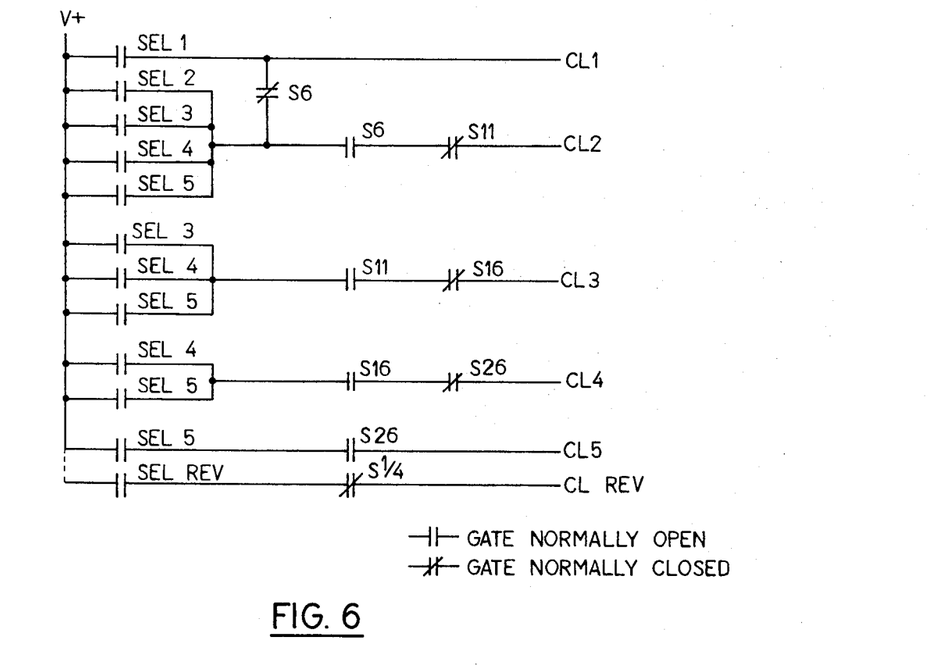
FIG. 6 is a schematic view showing more details of the speed switch circuit and the shift sequence and lock-up logic circuit shown in FIG. 5.

The speed switch circuits 124a through 124e shown in FIG. 5 operate solid state switches of logic circuit 110 shown symbolically in FIG. 6 as open or closed switches (designated S 1/4, S6, S11, S16, S26) which provide appropriate (on or off) output signals to clutch operating circuits CL1 through CL5 and CL REV shown in FIG. 6. The contacts 77 of range selection switch ERS are understood to be connected to provide input signals to trigger switch SEL1 through SEL5 and SEL REV of logic circuit 110. In FIG. 6 all contacts of switches SEL are shown in open condition and connected in a particular manner and the contacts of the speed switches S 1/4 through S26 are shown in particular conditions (i.e., open or closed). It is to be understood, however, that various combinations of control conditions other than shown could be provided to effect gear shifting at appropriate speeds.

The output terminals of circuit CL1 through CL6 and CL REV in FIG. 6 operate the solenoid valve amplifiers 111a through 111f, as shown in FIG. 5.

The control EC utilizes three frequency-to-voltage conversion channels: one for the transmission-speed pickup PS, one for the turbine overspeed pickup PT, and one for the accelerator pedal (throttle) position transducer TPS which has a frequency modulated output. Each frequency voltage to converter 121 and 126 provides low pass filtering, hysteresis stage buffer amplifying with positive feed-back to provide pulse squaring and noise rejection. Each pickup signal from the sensors PS and PT is amplified and filtered. The throttle position transducer TPS is, for example, a coil TPS1 with a movable iron slug TPS2 attached to the accelerator pedal. Movement of the slug varies the output frequency of the phase-shift oscillator 120, the output of which feeds into converter 121. The dc voltage, developed by the converter 121 and proportional to vehicle speed, is fed to the series of speed switches 124a through 124e, one for each shift point - from first to second up to fourth to fifth, and also the Fwd-Rev inhibit speed switch 124a. Each speed switch has adjustable set point and hysteresis. The hysteresis allows the downshift point to be set separately from the upshift point. The set points are biased by the output of the throttle-position transducer converter 121 so as to decrease the setpoints with decreasing throttle position. The output of the speed switches feeds into the control logic 110.

A continuity sensor (not shown) may be provided on the transmission magnetic-pickup device PS to provide a signal for an insufficient signal switch which indicates failure of sensor PS. Failure of sensor PS switches the speed filter time constant to a large value which controls the downshift rate (about 5 sec. for each range) required upon the loss of signal.

Figure 7:
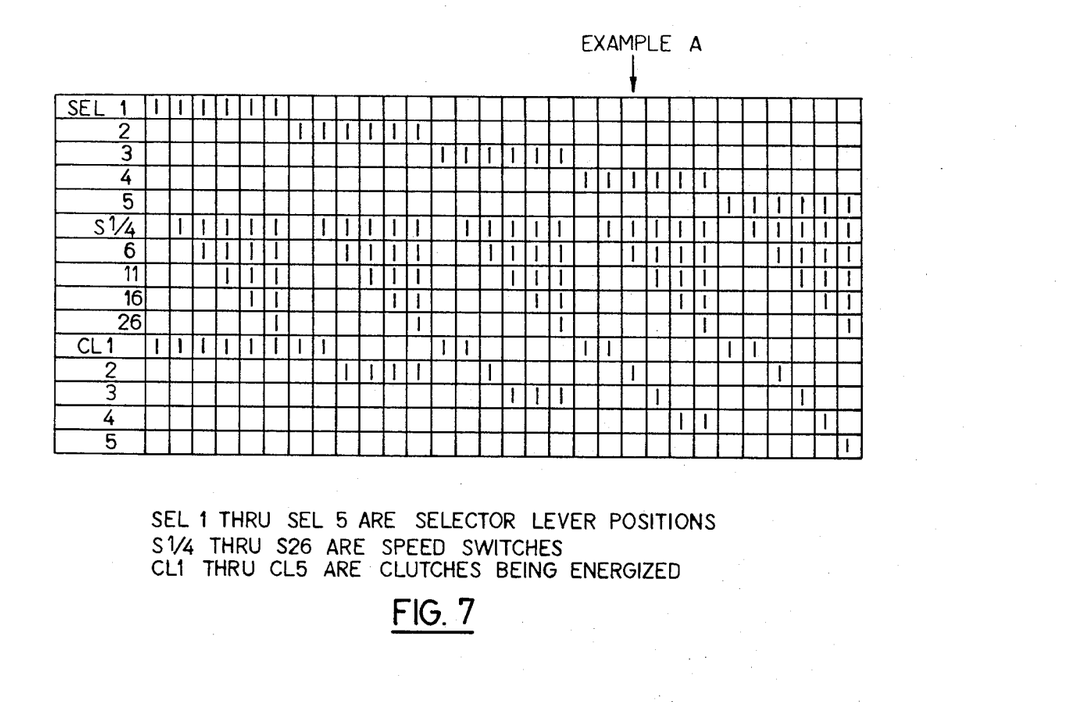
FIG. 7 is a truth table for the logic circuit of FIG. 6.

The logic for the forward gears second through fifth is controlled by latching functions understood to be embodied in the logic circuitry of FIG. 6 and depicted in the truth table in FIG. 7. Each latch is set by the dual condition that vehicle speed is above the set point for that gear and that the range selector ERS is set at least for that gear or above. Each latch is reset by vehicle speed falling below the set point for that gear, or by actuation of the override switch OS which also simultaneously disables every position of the range selector, or by engagement of the neutral or reverse gears. The latches pass through logic which selects the highest latch energized and actuates the corresponding solenoid-valve for that range. The minimum time delay (one-half sec.) between shifts is set, for example, by one-shot multivibrator embodied in circuit 110 and activated by any range change which inhibits further shifts during the delay (except for shifts to neutral). First gear is selected when no higher forward gear is energized and neither reverse or neutral is engaged nor is the override activated.

Reverse is selected when the vehicle speed is below the Forward-Reverse inhibit speed (approximately one-fourth MPH) and the range selector ERS is set to the reverse position; or on moving selector ERS from neutral to reverse. Reverse is then maintained (latched) for speeds greater than the Fwd-Rev inhibit speed, independent of the range selector position.

Neutral is selected when vehicle speed is below the Fwd-Rev inhibit speed and the range selector ERS is in the neutral position and override OS and reverse are not energized. Neutral is then latched-in regardless of speed, until the selector ERS is moved from neutral. Upon disengaging neutral, a one-shot multivibrator (not shown) provides a narrow pulse which enables reverse (in conjunction with the range selector being set to reverse) or enables all forward-gear latches for which the vehicle speed exceeds their set points. This permits shifts from neutral directly to the forward gear which corresponds to the vehicle speed, when the selector is moved forward, and neutral to reverse shifts when the selector is moved to reverse.

The latches in the selector switch inputs for reverse and neutral are to hold each input until another is selected, during the time the selector switch ERS is in transition between positions.

Lockup inhibit is removed when solenoid 115 is de-energized by coincidence of the gear engaged with the same gear selected by the range switch ERS. Retarder RV is engaged when a turbine overspeed condition occurs while in lockup (i.e. lockup is not inhibited).

Typical Operation of Electronic System

Reference should be made to FIGS. 6 and 7 for an understanding of typical forward shifting operations. It is to be assumed that only one clutch may be energized at any time. Furthermore, in FIG. 6, if any normally open speed switch S 1/4, S6, S11, S16 or S26 is closed, all lower speed switches will also close. Also, as the truth table in FIG. 7 shows, no clutch above that selected by the lever position of selector ERS will be energized. Furthermore, if vehicle speed is below that for a given position of selector ERS, then the ground speed of the vehicle will determine which clutch will be energized. Each vertical column of the truth table in FIG. 7 depicts a particular situation which may exist.

In the column of the truth table in FIG. 7 designated as Example A: the selector lever of ERS is in the fourth speed position; vehicle ground speed has closed the 6 mph speed switch S6 (speed is above 6 mph but below 11 mph); and the result is that only clutch circuit CL2 is energized.

In connection with FIG. 6, it is to be understood that all SEL switches of the same designation number close simultaneously when the operating handle selector switch ERS is moved to a particular position. However, only one of the SEL switches that close will effect a control function. Again, for example, if the vehicle is at zero ground speed and if the switches SEL3 all close, only clutch circuit CL1 will be energized to engage clutch C1. At that point, application of the engine throttle will increase vehicle speed from zero to 6 mph, at which speed switch S6 for clutch circuit CL1 opens and switch S6 for clutch circuit CL2 closes. Thus, at 6 mph, clutch C1 disengages and clutch C2 engages, since switch S11 for clutch C2 is already closed. As vehicle speed further increases, switch S11 for clutch circuit CL2 opens and switch S11 for clutch circuit CL3 closes. Thus, at 11 mph, clutch C2 disengages and clutch C3 engages. However, since selector ERS is in position 3, no clutch above clutch C3 will be engaged, even if speed increases.

We claim:

1. An automatically controlled transmission having a torque converter driven by an engine, a speed changing gear shift mechanism driven by said torque converter, shifting means including solenoid operated valves for selectively shifting said gear shift mechanism into desired speed ranges, lock-up clutch means including a lock-up clutch valve for releasably connecting said torque converter to said engine in direct drive at predetermined engine speeds, sensing means responsive to the speed of said gear shift mechanism to operate said lock-up clutch valve to engage said lock-up clutch means in each selected speed range when a predetermined engine speed is reached and to disengage said lock-up clutch means prior to a downshift from one speed range to another, a lock-up clutch solenoid valve for inhibiting operation of said lock-up clutch valve, manually operable speed selector means shiftable to up-shift and down-shift positions and providing an electric output signal related thereto, output speed sensing means responsive to the output speed of said gear shift mechanism and providing an electrical output signal related thereto, and electronic control means responsive to signals from said speed selector means and said output speed sensing means to operate said solenoid valves of said shifting means to effect shifting to selected ranges when said output speed is at said predetermined speed and to effect automatic shifting at a speed other than at said predetermined speed in order to maintain appropriate speed in view of the speed range selected, and to operate said lock-up clutch solenoid valve to inhibit operation of said lock-up clutch valve and prevent engagement of said lock-up clutch means until said predetermined engine speed for a particular speed range is reached.

2. A transmission according to claim 1 wherein said electronic control means comprises a first circuit including a first logic circuit for supplying output signals to said solenoid valves for said gear shift mechanism for shift sequencing and to said lock-up clutch solenoid valve for lock-up inhibition, and a second circuit comprising a time delay circuit and speed switch circuits for receiving input signals from said gear shift mechanism speed sensor and supplying output signals to said first logic circuit.

3. A transmission according to claim 2 wherein said second circuit comprises an oscillator circuit, a first pulse shaper circuit and a frequency converter circuit for adapting signals received from said gear shift mechanism speed sensor for use by said first logic circuit.

4. A transmission according to claim 1 wherein said control means includes adjustable speed switches which are adjustable to enable selection of said predetermined speed.

5. A transmission according to claim 4 wherein said control means includes time delay means in circuit with said adjustable speed switches to maintain said gear shift mechanism in each transitional speed range for a predetermined interval of time when said speed selector means is shifted from one speed range to another speed range other than the next adjacent speed range.

6. A transmission according to claim 1 wherein said logic circuit of said control means prevents shifting into the neutral range unless said speed selector means is shifted to the neutral position.

7. A transmission according to claim 6 wherein said logic circuit of said control means prevents shifting into neutral until a predetermined low speed is reached.

8. A transmission according to claim 1 wherein said logic circuit of said control means prevents reversal in shifting until a predetermined low speed is reached.

9. A transmission according to claim 1 wherein said control means includes fail-safe means responsive to electrical failure in said control means to maintain said gear shift mechanism in the selected range.

10. A transmission according to claim 1 including selectively operable over-ride means including a selectively operable override switch to disconnect said control means and connect said speed selector means for direct operation of said shifting means.

11. An automatically controlled transmission having a torque converter driven by an engine having a throttle, a speed changing gear shift mechanism driven by said torque converter, shifting means including solenoid operated valves for selectively shifting said gear shift mechanism into desired speed ranges, lock-up clutch means including a lock-up clutch valve for releasably connecting said torque converter to said engine in direct drive at predetermined engine speeds, sensing means responsive to the speed of said gear shift mechanism to operate said lock-up clutch valve to engage said lock-up clutch means in each selected speed range when a predetermined engine speed is reached and to disengage said lock-up clutch means prior to a downshift from one speed range to another, a lock-up clutch solenoid valve for inhibiting operation of said lock-up clutch valve, manually operable speed seector means shiftable to up-shift and down-shift positions and providing an electric output signal related thereto, output speed sensing means responsive to the output speed of said gear shift mechanism and providing an electrical output signal related thereto, throttle position sensing means responsive to throttle position and providing an electric output signal related thereto, a retarder including a retarder solenoid valve for retarding the speed of said torque converter when the latter is in direct drive and its speed exceeds a predetermined engine idle speed, turbine speed sensing means responsive to the speed of said torque converter and providing an electric signal related thereto, and electronic control means responsive to signals from said speed selector means, from said output speed sensing means, from said throttle position sensing means and from said turbine speed sensing means to provide output signals to said solenoid operated valves of said shift mechanism to operate said solenoid operated valves to effect automatic up-shifting and down-shifting to selected ranges when said output speed is at said predetermined speed and to effect automatic shifting at a speed other than at said predetermined speed in order to maintain appropriate speed in view of the speed range selected, and to operate said lock-up clutch solenoid valve to inhibit operation of said lock-up clutch valve and prevent engagement of said lock-up clutch means until said predetermined engine speed for a particular speed range is reached.

12. A transmission according to claim 11 wherein said electronic control means comprises a first circuit including a first logic circuit for supplying output signals to said solenoid valves for said gear shift mechanism for shift sequencing and to said lock-up clutch solenoid valve for lock-up inhibition, said first circuit further comprising a second logic circuit for operating said retarder solenoid valve, a second circuit comprising a time delay circuit and speed switch circuits for receiving input signals from said throttle position sensor and said gear shift mechanism speed sensor and supplying output signals to said first logic circuit; and a third circuit comprising a set point speed switch circuit for receiving input signals from said torque converter turbine speed sensor and supplying output signals to said second logic circuit to operate said retarder solenoid valve.

13. A transmission according to claim 12 wherein said second circuit comprises an oscillator circuit, a first pulse shaper circuit and a frequency converter circuit for adapting signals received from said throttle position sensor and said gear shift mechanism speed sensor for use by said first logic circuit; and wherein said third circuit comprises a second pulse shaper circuit and a frequency converter circuit for adapting signals received from said torque converter turbine speed sensor for use by said second logic circuit.

14. A transmission according to claim 12 including a selectively operable override switch on said speed selector means for bypassing said electronic control means and to allow said speed selector means to operate said gear shift mechanism solenoid valves directly.

15. An automatically controlled vehicle transmission having a turbine type torque converter driven by an engine controlled by a throttle for driving a speed changing gear shift mechanism which transmits power to vehicle wheels, said gear shift mechanism comprising solenoid valves; a lock-up clutch for connecting said torque converter into direct drive by said engine when engine speed is sufficiently high; a lock-up clutch valve responsive to pressure conditions in said gear shift mechanism for shifting said lock-up clutch in or out of clutch lock-up; a lock-up clutch solenoid valve for inhibiting operation of said lock-up clutch valve; retarder means including a retarder solenoid valve for said torque converter which engages to effect retardation of the speed of said gear shift mechanism when said torque converter is in direct drive and torque converter turbine speed exceeds engine high idle speed and which disengages after said lock-up clutch disengages; a manually operable speed range selection switch; an output speed sensor responsive to the speed of the gear shift mechanism; a turbine speed sensor responsive to the speed of said torque converter; an engine throttle position sensor; and an electronic controller to provide electrical output signals for operation of said lock-up clutch solenoid valve, said gear shift mechanism solenoid valves, and said retarder solenoid valve, said electronic controller receiving input signals from said speed range selection switch; from said output speed sensor; from said turbine speed sensor and from said engine throttle position sensor; said electronic controller comprising a first circuit including a first logic circuit for supplying output signals to said solenoid valves for said gear shift mechanism for shift sequencing and to said lock-up clutch solenoid valve for lock-up inhibition, said first circuit further comprising a second logic circuit for operating said retarder solenoid valve, a second circuit comprising a time delay circuit and speed switch circuits for receiving input signals from said throttle position sensor and said gear shift mechanism speed sensor and supplying output signals to said first logic circuit; and a third circuit comprising a set point speed switch circuit for receiving input signals from said torque converter turbine speed sensor and supplying output signals to said second logic circuit to operate said retarder valve solenoid.

16. A transmission according to claim 15 wherein said second circuit comprises an oscillator circuit, a first pulse shaper circuit and a frequency converter circuit for adapting signals received from said throttle position sensor and said gear shift mechanism speed sensor for use by said first logic circuit; and wherein said third circuit comprises a second pulse shaper circuit and a frequency converter circuit for adapting signals received from said torque converter turbine speed sensor for use by said second logic circuit.

17. A transmission according to claim 16 including a selectively operable override switch on said speed range selection switch for bypassing said electronic controller and to allow said speed range selection switch to operate said gear shift mechanism solenoid valves directly.

* * * * *